Patented Nov. 29, 1966

3,288,803
PROCESS FOR THE CONVERSION OF CYCLO-
DODECADIENE CARBOXYLIC ACID ESTERS
TO 2,3,6,7,8,9-HEXAHYDRO-1H-BENZ[e] IN-
DENE AND DERIVATIVES THEREOF
William F. Erman and Herbert C. Kretschmar, Cincinnati, Ohio, assignors to The Procter & Gamble Company, Cincinnati, Ohio, a corporation of Ohio
No Drawing. Filed Sept. 17, 1964, Ser. No. 397,306
10 Claims. (Cl. 260—308)

This invention relates to a new class of organic cyclic compounds and a process for their preparation. More specifically, this invention relates to 2,3,6,7,8,9-hexahydro-1H-benz[E]indene and derivatives thereof, as well as a process for the preparation thereof.

The novel class of chemical compounds prepared by the the present invention are valuable intermediates useful in the preparation of many organic compounds. The compounds of this invention, by their distinct aromatic ring system are especially useful for the preparation of compounds which require ortho-disubstitutioin on an aromatic ring, with no positions open for competing substitution reactions. This invention in its broadest terms, therefore, affords an easy entry to ortho-disubstituted aromatic systems by simple electrophilic addition: for example, the preparation of an o-dinitro derivative can be effected by direct treatment with nitric acid. Specific illustrations of the types of compounds which can be prepared from the compounds of this invention are given in more detail hereinafter.

The primary object of the present invention, therefore, is to provide a new class of cyclic organic compounds. Another object is to provide a novel process for the preparation of these new compounds. Other objects of this invention will become apparent upon reading the following detailed description.

The compounds provided by the present invention correspond to the following general formulae:

(a)

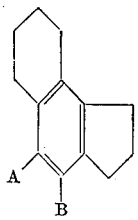

wherein A and B are substituents each being selected from the group consisting of hydrogen, halogen, a nitro radical and an amino radical;

(b)

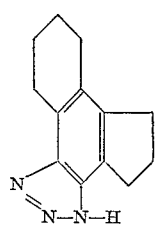

and (c)

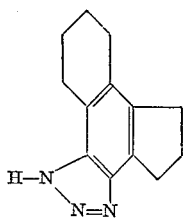

In the first formula above, (a) the halogen can be selected from bromine, chlorine, fluorine and iodine. Examples of compounds which can be prepared according to this invention are listed below.

2,3,6,7,8,9-hexahydro-1H-benz[e]indene
4,5-dinitro-2,3,6,7,8,9-hexahydro-1H-benz[e]indene
4,5-dibromo-2,3,6,7,8,9-hexahydro-1H-benz[e]indene
4,5-dichloro-2,3,6,7,8,9-hexahydro-1H-benz[e]indene
4,5-difluoro-2,3,6,7,8,9-hexahydro-1H-benz[e]indene
4,5-diiodo-2,3,6,7,8,9-hexahydro-1H-benz[e]indene
4,5-diamino-2,3,6,7,8,9-hexahydro-1H-benz[e]indene
5,6,7,8,9,10-hexahydrobenz[g]-4H-indeno[4,5-e]-3H-triazole
5,6,7,8,9,10-hexahydrobenz[g]-4H-indeno[4,5-e]-1H-triazole Other examples include:

4-nitro-2,3,6,7,8,9-hexahydro-1H-benz[e]indene
5-nitro-2,3,6,7,8,9-hexahydro-1H-benz[e]indene
4-nitro-5-chloro-2,3,6,7,8,9-hexahydro-1H-benz[e]indene
4-bromo-5-nitro-2,3,6,7,8,9-hexahydro-1H-benz[e]indene
4-bromo-5-chloro-2,3,6,7,9-hexahydro-1H-benz[e]indene
4-nitro-5-amino-2,3,6,7,8,9-hexahydro-1H-benz[e]indene
4-amino-2,3,6,7,8,9-hexahydro-1H-benz[e]indene
5-amino-2,3,6,7,8,9-hexahydro-1H-benz[e]indene
4-amino-5-fluoro-2,3,6,7,8,9-hexahydro-1H-benz[e]indene In general terms, the novel process of this invention involves an acid catalyzed rearrangement of cyclododecadiene carboxylate esters to 2,3,6,7,8,9-hexahydro-1H-benz[e]indene. While the invention is not limited to any theory as regards the mechanism of the reaction, it is believed that the conversion proceeds mechanistically via a molecular rearrangement involving transannular cyclization between two olefins, intramolecular interaction of a double bond and an incipient acylonium ion, and an acid catalyzed Wagner-Meerwein Rearrangement. This single step conversion process which is described below, leads to the preparation of the parent compound, 2,3,6,7,8,9-hexahydro-1H-benz[e]indene, as well as its derivatives.

The carboxylic acid ester starting materials are introduced into an acid medium prepared according to the manner set forth hereinafter, and, upon heating, are converted to the desired cyclic compound. The specific conditions necessary for the acid catalysis to occur, vary depending on the specific esters and catalysts which are used.

The cyclic esters, that is the cyclododecadiene carboxylate esters, which are useful in the present invention have the following general formula:

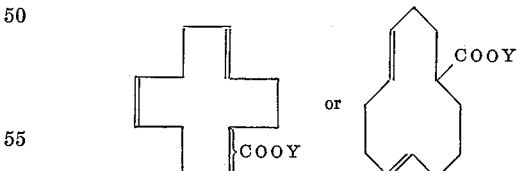

wherein Y represents any organic radical. Actually the formation of 2,3,6,7,8,9-hexahydro-1H-benz[e]indene, the parent compounds, proceeds through the following acylonium ion:

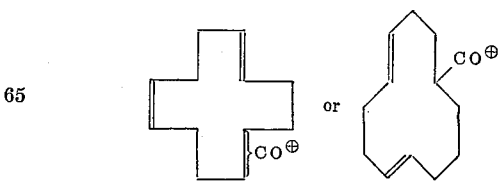

Thus, Y can suitably be an alkyl radical having from 1 to 20 carbon atoms or higher, an aryl radical, a substituted aryl radical or any other organic substituent. However, because of solubility considerations, the preferred carboxylic acid esters are those wherein Y is methyl or lower alkyl groups having less than 8 carbon atoms.

Specific examples of suitable esters which can be used are those in which Y is

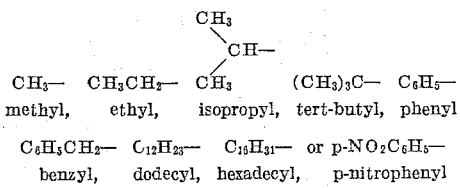

| CH₃— | CH₃CH₂— | CH₃\CH—/CH₃ | (CH₃)₃C— | C₆H₅— |
| methyl | ethyl | isopropyl | tert-butyl | phenyl |

| C₆H₅CH₂— | C₁₂H₂₃— | C₁₆H₃₁— | or p-NO₂C₆H₅— |
| benzyl | dodecyl | hexadecyl | p-nitrophenyl |

The esters can be prepared by any known manner. One excellent process is described in detail in the co-pending patent application Serial No. 311,962 of William P. Erman filed on September 27, 1963.

The acids which have been found to effect the ester transformation to the new compounds of this invention are Lewis acids which have a pKa value of not greater than about 4, preferably in the range of from about 1 to about 4. Such acids include the following which are given by way of example: hydrochloric acid, sulfuric acid, phosphoric acid, boron trifluoride, hydrofluoric acid, fumaric acid, formic acid, chloroacetic acid, dichloroacetic acid and trifluoroacetic acid.

Of the above listed Lewis acids, the preferred ones are formic acid, chloroacetic acid, dichloroacetic acid and trifluoroacetic acid.

Carboxylic acids having a pKa value in the lower permissive range, i.e. 0 to 4, or more particularly those having a pKa value of less than about 1 can be used satisfactorily but for optimum yields of 2,3,6,7,8,9-hexahydro-1H-benz[e]indene these acids should be diluted with a suitable solvent, e.g. acetic acid.

Acids having a pKa value in excess of about 4 do not induce the necessary rearrangement. Examples of acids which are not suitable in terms of the present invention are the following acids: acetic, propionic, butyric and other simple alkyl carboxylic acids, as well as phenol and alkyl substituted phenols.

It has also been discovered that addition of water to the specific Lewis acid facilitates the conversion to the desired end product. In fact, it is desirable to use the acid at from about 85% to about 98% concentration in admixture with from about 2% to about 15% water. Exceptionally high yields are obtained with 90% aqueous formic acid which is the most preferred acid of those listed above. Percentages used herein are by weight, unless otherwise specified.

The ratio of acid to ester is not critical in this reaction. However, it is desirable to employ an excess of acid over the ester for optimum results, e.g. from about 4 to about 15 times the volume of the acid to the ester. The specific amount of acid necessary to optimize the rearrangement can easily be determined for each set of materials. For this reason, there is no desire to limit the present invention to any specific levels of reactants. Besides serving to catalyze the cyclization, the acid reactant can serve as a solvent for the system.

The conversion reaction proceeds within the temperature range of from about 50° C. to about 200° C. A preferred temperature range is from about 70° C. to about 120° C. While the temperature of the reaction is important and heating is certainly an integral part of the novel process, the optimum temperature for any combination of acid catalyst and carboxylic ester can be readily determined. Temperatures in excess of 200° C. lead to lower yields of 2,3,6,7,8,9-hexahydro-1H-benz[e]indene and an increase in polymer formation and should therefore be avoided. At the same time, temperatures below 50° C. cause the rearrangement to proceed at a rate too slow to be of practical use. Pressure is non-critical; atmospheric pressure is suitable for the process.

The reaction should be allowed to run from about 24 hours to about 96 hours with a preferred time period of from about 48 to about 72 hours. Here again just as with such conditions as temperature, acid strength, amounts of acid catalyst and carboxylic acid ester, the duration of the reaction must be considered in the light of the specific materials used. As a guide, however, the limits set forth above have been found generally applicable. No advantage is gained by letting the reaction run beyond about 72 to 96 hours, although it is possible to do so. Similarly, running the reaction for less than 24 hours has the effect of lowering the yield of the desired product.

With the aqueous acids, as in the case of 90% formic, the reaction system is a heterogeneous one. In these instances, agitation can be beneficial. This can be performed by stirring, shaking or by other conventional stirring means.

The yield of the desired product will vary as a direct function of the several variable conditions referred to above. Generally though, it is possible to obtain yields on the order of from about 10% to about 40% by using routine laboratory techniques.

Recovery of the final product if desired presents no unusual problems and is usually accomplished by dilution of the reaction mixture with water, extraction of the product with petroleum ether, removal of acid catalyst by a water wash and filtration over alumina. In this manner the 2,3,6,7,8,9-hexahydro-1H-benz[e]indene is isolated in 88% to 92% purity. Higher purity can be obtained if desired, by known methods such as preparative gas chromatography or fractional distillation.

When it is desired to prepare one of the derivatives, it can be prepared by known synthetic procedures using 2,3,6,7,8,9-hexahydro-1H-benz[e]indene as a starting material. Such preparations are illustrated and exemplified in the following discussion. These examples are not intended to limit the scope of the invention but only to illustrate it.

EXAMPLE I

*2,3,6,7,8,9-hexahydro-1H-benz[e]indene. Rearrangement of methyl 4,8-trans, trans-cyclododecadiene-1-carboxylate in 90° formic acid*

A mixture of 50.0 g. (0.248 mole) of methyl 4,8-trans, trans-cyclododecadiene-1-carboxylate, B.P. 105° (0.9 mm.), prepared as described in co-pending patent application Serial No. 311,962 of William F. Erman filed September 27, 1963, and 610.0 g. (13.26 moles) of 90% formic acid was heated at reflux (100°) for 72 hours. The mixture was cooled to room temperature, diluted with 500 ml. of ice-water, and the resulting oil extracted three times with 200 ml. portions of petroleum ether (B.P. 40.0–41.5°). The combined petroleum ether extracts were washed with 3–100 ml. portions of ice-water, dried over magnesium sulfate and evaporated under reduced pressure to afford 31.2 g. of dark brown liquid. The liquid was redissolved in 300 ml. of petroleum ether and adsorbed on 300 g. of Woelm Activity I neutral alumina. Elution with 1200 ml. of petroleum ether afforded 13.8 g. (36%) of 2,3,6,7,8,9-hexahydro-1H-benz[e]indene (88% pure) as a colorless liquid, B.P. 65° (0.6 mm.). Gas chromatography on a 10 ft. ¼ in. diameter column packed with 20% ethylene glycol succinate polymer on 60/80 mesh acid washed chromosorb at 200° with a flow rate of 60 ml. of helium per minute showed five peaks: Peak #1 (6.6%), retention time 5 min. 40 sec.; Peak #2 (0.8%), retention time 7 min. 0 sec.; Peak #3 (87.6%), retention time 7 min. 50 sec.; Peak #4 (0.8%), retention time 10 min. 25 sec.; Peak #5 (4.3%), retention time 11 min. 30 sec. Peak #3 (87.6%), 2,3,6,7,8,9-hexahydro-1H-benz[e]indene, was isolated in pure form by preparative gas chromatography under the above conditions. The infrared, n.m.r., mass and ultraviolet spectra were consistent with the assigned structure. Infrared spectrum: λmax 6.28μ and 6.75μ (aromatic); 12.05μ and 12.5μ (1,2,3,4-tetrasubstitution). N.m.r. spectrum: 3.12τ (d,J=9.0 c.p.s.), 3.30τ (d,J=9.0 c.p.s.) [2.1] (aromatic protons), 7.00–7.65τ (m) [8.05] (benzyl protons), 7.70–8.40τ (m) [5.9] (methylene protons). Mass spectrum: m/e 172 (parent ion peak and mass peak); 28

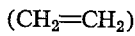

144

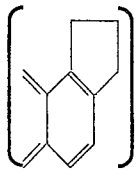

Ultraviolet spectrum: λmax 269 mμ (ε556), λmax 273 mμ (ε468), λmax 276 mμ (ε556).

*Analysis.*—Calcd. for $C_{13}H_{16}$: C, 90.6; H, 9.4. Found: C, 90.4; H, 9.4.

EXAMPLE II

*Rearrangement of the mixture of methyl 4,8-cis,trans, 4,8 - trans,cis, and 4,8-trans,trans-cyclododecadiene-1-carboxylate in 90° formic acid*

This rearrangement was carried out as described above in Example I with the following exceptions. From 13.3 g. of a 41:35:24 mixture of methyl 4,8-cis,trans, 4,8-trans,cis, and 4,8-trans,trans-cyclododecadiene-1-carboxylate, B.P. 130° (0.5 mm.), prepared as described in copending patent application Serial No. 311,962 of William F. Erman filed September 27, 1963, there was isolated after column chromatography 2.70 g. of colorless liquid (26%). Gas chromatography showed that this liquid was 91.0%, 2,3,6,7,8,9-hexahydro-1H-benz[e]indene. A sample of 2,3,6,7,8,9-hexahydro-1H-benz[e]indene was collected by preparative gas chromatography and was identical in every respect (i.e. infrared, n.m.r., gas chromatography) with a sample of 2,3,6,7,8,9-hexahydro-1H-benz[e]indene prepared via rearrangement of the trans,-trans-cyclododecadiene ester.

EXAMPLE III

*Rearrangement of methyl 4,8-trans,trans-cyclododecadiene-1-carboxylate in 50% (by volume) trifluoroacetic acid in acetic acid*

A mixture of 5.0 g. (0.022 mole) of methyl 4,8-trans,trans-cyclododecadiene-1-carboxylate and a solution of 25 ml. (38.3 g.) of trifluoroacetic acid (B.P. 71–73°) in 25 ml. (26.2 g.) of acetic acid (B.P. 18°) was heated at reflux for 72 hours. After work-up and chromatography there was isolated 0.801 g. (18%) of 2,3,6,7,8,9-hexahydro-1H-benz[e]indene (88%) purity.

EXAMPLE IV

*Rearrangement of methyl 4,8-trans,trans-cyclododecadiene-1-carboxylate in trifluoroacetic acid*

From 5.0 g. (0.022 mole) of the trans,trans-ester and 50 ml. (76.6 g.) of trifluoroacetic acid treated as above in Example III, there was isolated 0.350 g. (9%) of 2,3,6,7,8,9-hexahydro-1H-benz[e]indene in 90% purity.

EXAMPLE V

*Rearrangement of methyl 4,8-trans,trans-cyclododecadiene-1-carboxylate in 90% chloroacetic acid*

From 5.0 g. (0.022 mole) of the trans,trans-ester and 50 ml. (79.0 g.) of 90% chloroacetic acid treated as above in Example IV, there was isolated 0.435 g. (10%) of 2,3,6,7,8,9-hexahydro-1H-benz[e]indene in 83% purity.

EXAMPLE VI

*Preparation of 4,5-dinitro-2,3,6,7,8,9-hexahydro-1H-benz[e]indene*

To a solution of 1.0 g. (0.006 mole) of 2,3,6,7,8,9-hexahydro-1H-benz[e]indene in 25 ml. of chloroform was added 15 ml. of concentrated sulfuric acid. The mixture was cooled to 10° and 2 ml. of concentrated nitric acid (fuming nitric acid can be used in place of concentrated nitric acid) added dropwise with cooling by means of an ice-salt bath over a period of about 5 minutes. As soon as addition was complete the chloroform layer was partitioned and washed with 100 ml. of 10% sodium carbonate solution, with 3–50 ml. portions of water and dried over magnesium sulfate. Evaporation of solvent under reduced pressure afforded 0.45 g. (29%) of 4,5-dinitro-2,3,6,7,8,9-hexahydro-1H-benz[e]indene as fine yellow prisms, M.P. 137–138.8° after one recrystallization from ethanol. Infrared spectrum ($CCl_4$ solution): 6.22–6.65μ ($NO_2$), 7.3–7.55 ($NO_2$). N.m.r. spectrum: 6.5–7.2τ (m) ($C_3,C_6$-benzyl protons overlapping with $C_1,C_9$-benzyl protons); 7.0–7.5τ (m) ($C_1,C_9$-benzyl protons overlapping with $C_3,C_6$-benzyl protons) [total area of $C_3,C_6,C_1,C_9$ protons=8.4]; 7.5–8.1τ ($C_2$ protons overlapping with $C_7,C_8$ protons); 8.0–8.3τ ($C_7,C_8$ protons overlapping with $C_2$ protons) [total area of $C_2,C_7,C_8$ protons=5.6].

*Analysis.*—Calcd. for $C_{13}H_{14}O_4N_2$: C, 59.3; H, 5.4. Found: C, 59.7; H, 5.6.

So far as the utility of the chemical compounds prepared by the present invention is concerned, the following procedure demonstrates that 2,3,6,7,8,9-hexahydro-1H-benz[e]indene can very readily and efficiently be converted to a valuable naphthalene derivative. The naphthalene derivative so formed has well known applications for the preparation of azo-dyes.

*Preparation of a naphthalene derivative, 2,3-dihydro-1H-benz[e]indene by the dehydrogenation of 2,3,6,7,8,9-hexahydro-1H-benz[e]indene*

2,3,6,7,8,9-hexahydro-1H-benz[e]indene 1.0 g., as prepared in Example I, (0.006 mole) was placed in the bottom of a heavy walled test tube (35 x 200 mm.) and covered with 3.0 g. of 10% palladium on charcoal. The neck of the tube was filled with glass wool (pretreated by extraction with ether). Approximately one inch of the tube was submerged in a Woods' metal bath and heated under a positive nitrogen atmosphere for 24 hours at 225–235°. The mixture was cooled to room temperature, the glass wool removed and the residue triturated with 90 ml. of ether (3 x 30 ml.). The etheral layers were combined and filtered through a double fluted filter paper. Evaporation of the ether afforded 0.60 g. of colorless liquid. Gas chromatography on a 10 ft. ¼ in. column packed with 30% ethylene-glycol-succinate polymer on 60/80 mesh chromosorb at 200° with a flow rate of 85 ml. of helium per minute showed two peaks. Peak #1 (38%), retention time 7 min. 31 sec., 2,3,6,7,8,9-hexahydro-1H-benz[e]indene. Peak #2 (62%), retention time 15 min. 31 sec., 2,3-dihydro-1H-benz[e]indene. Peak #2 was collected by preparative gas chromatography under the above conditions. The infrared and n.m.r. spectra of this material were identical with those of an authentic sample of 2,3-dihydro-1H-benz[e]indene from Aldrich Chemical Company. Infrared spectrum: 3.30, 3.42μ (w) (aromatic protons), 6.18, 6.21, 6.75μ (w) (naphthalene), 12.4, 13.03, 13.51μ (w) (1,2-disubstitution). N.m.r. spectrum: 2.12–2.9τ (m) (aromatic protons) [5.7], 6.8τ (t,J=8.0 c.p.s.), 6.92τ (t,J=8.0 c.p.s.) ($C_{11},C_3$-benzyl protons) [total area $C_1,C_3$ protons=4.4] 7.85τ (quintet, J=9.0 c.p.s. $C_2$-methylene protons) [1.94]. The 2,3-dihydro-1H-benz[e]indene was analyzed as the picrate derivative, M.P. 108–108.5° [lit. M.P. 108° (G. A. R. Kon, J. Chem. Soc., 1081 (1933)].

*Analysis.*—Calcd. for $C_{19}H_{15}O_7N_3$: C, 57.4; H, 3.8; N, 10.6. Found: C, 57.6; H, 4.0; N, 10.5.

A mixture melting point of the above picrate M.P. 108–108.5° with that of an authentic sample of 2,3-dihydro-1H-benz[e]indene picrate, M.P. 108–108.5°, was undepressed, M.P. 108–108.5°.

It has also been demonstrated in Example VI that 2,3,6,7,8,9-hexahydro-1H-benz[e]indene can be converted easily to the dinitro derivative, 4,5-dinitro-2,3,6,7,8,9-hexahydro-1H-benz[e]indene. This dinitro compound furthermore can easily be converted to a diamine derivative according to the following equation:

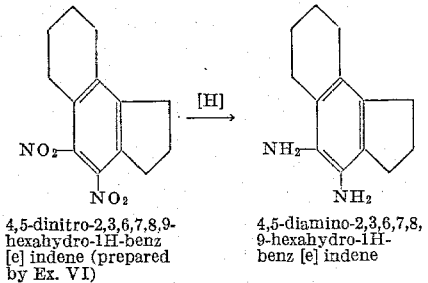

4,5-dinitro-2,3,6,7,8,9-hexahydro-1H-benz[e]indene (prepared by Ex. VI)

4,5-diamino-2,3,6,7,8,9-hexahydro-1H-benz[e]indene

The conversion of the dinitro derivative to the diamine derivative as presented in the preceding equation can be readily carried out for instance by treating aromatic dinitro compounds with any one of several reducing systems, e.g., metal-acid combinations such is iron, tin, etc., aluminum amalgams in aqueous alcohol, lithium-aluminum hyride, and catalytic hydrogenation reactions. There is no criticality attached to any one of the preceding reducing reactions since they all can give excellent results. A complete summary of other methods for carrying out this reaction can be found in Wagner and Zook, "Synthetic Organic Chemistry," Chapter 24, page 654.

The product of the preceding reduction reaction, 4,5-diamino-2,3,6,7,8,9-hexahydro-1H-benz[e]indene is a versatile intermediate for the preparation of a variety of compounds which possess well defined utility. For example, one of the uses is in the formation of diazine derivatives by interaction with α-diketones. This reaction constitutes a diagnostic test for these ketones. The reaction may be depicted as shown below.

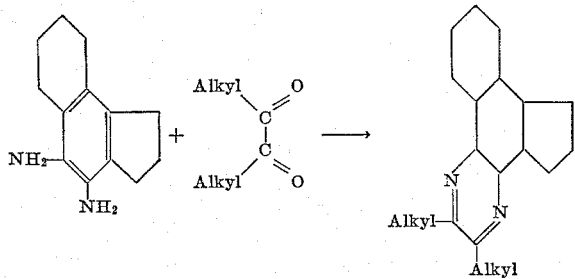

In addition, 4,5-diamino-2,3,6,7,8,9-hexahydro-1H-benz[e]indene is useful for the preparation of mono-para-toluene-sulfonamides according to the following equation. Such compounds are useful as reagents in the quantitative analysis of cupric ion.

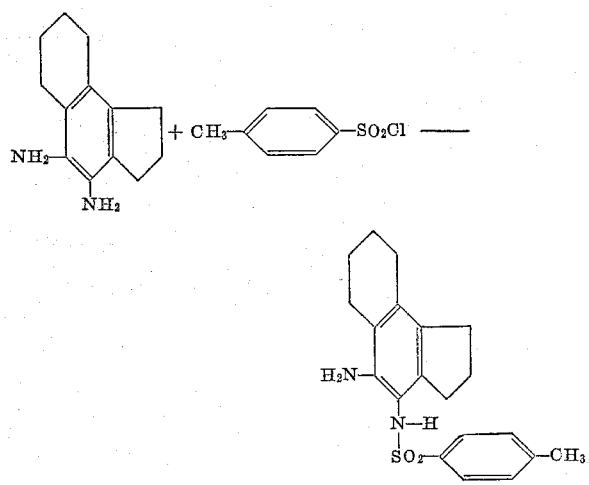

The conversion of 2,3,6,7,8,9-hexahydro-1H-benz[e]indene to any one of the halogen derivatives mentioned above such as 4,5 - dibromo - 2,3,6,7,8,9-hexahydro-1H-benz[e]indene 4,5-dichloro - 2,3,6,7,8,9 - hexahydro-1H-benz[e]indene and 4,5-difluoro-2,3,6,7,8,9-hexahydro-1H-benze[e]indene are easily accomplished and can be performed by several well known methods. One method involves reacting the 2,3,6,7,8,9 - hexahydro - 1H-benz[e]indene with the desired halogen in the presence of halogen carriers such as certain metal salts, e.g. Fe, FeBr$_3$, FeCl$_3$, etc., or a crystal of iodine. Other available methods for the halogenation reaction are described in Wagner and Zook, "Synthetic Organic Chemistry," Chapter 4, page 98.

The benzotriazole derivatives such as 5,6,7,8,9,10-hexahydrobenz[g]-4H-indeno[4,5-e]-1H-triazole and 5,6,7,8,9,10 - hexahydrobenz[g]-4H-indeno[e]-3H-triazole can be prepared by treatment of 4,5-diamino-2,3,6,7,8,9-hexahydro-1H-benz[e]indene with nitrous acid.

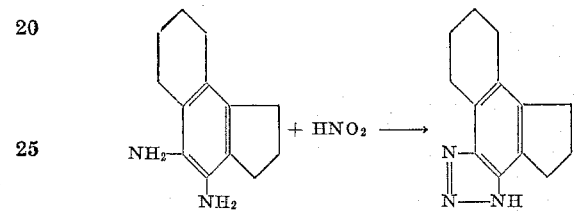

The resulting triazole compounds are useful as photographic chemicals and as corrosion inhibitors.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. In a process for the conversion of cyclododecadiene carboxylic acid esters to 2,3,6,7,8,9-hexahydro-1H-benz[e]indene and derivatives thereof, the improvement which comprises the step of heating said cyclododecadiene carboxylic acid esters in the presence of a Lewis acid having a pKa value of not greater than about 4.

2. The process of claim 1 wherein the Lewis acid has a pKa value within a range of from about 1 to about 4.

3. The process of claim 2 wherein the Lewis acid is used at a concentration within the range of from about 85% to about 98% with from about 2% to about 15% water.

4. The process of claim 3 wherein the Lewis acid is 90% aqueous formic acid.

5. The process of claim 3 wherein the Lewis acid is 90% aqueous chloroacetic acid.

6. In a process for the conversion of cyclododecadiene carboxylic acid esters to 2,3,6,7,8,9-hexahydro-1H-benz[e]indene and derivatives thereof, the imppprovement which comprises the step of heating said ester in the presence of a Lewis acid having a pKa value of not greater than about 4, to a temperature within the range of from about 50° C. to about 200° C. for a period of time ranging from about 24 hours to about 72 hours.

7. The process described in claim 6 which includes the additional step of recovering 2,3,6,7,8,9-hexahydro-1H-benz[e]indene.

8. The process of claim 6 including agitating the reaction mixture simultaneously with said heating step.

9. 5,6,7,8,9,10 - hexahydrobenz[g] - 4H-indeno[4,5-e]-3H-triazole.

10. 5,6,7,8,9,10 - hexahydrobenz[g]-4H-indeno[4,5-e]-1H-triazole.

References Cited by the Examiner

Skvarchenko et al.: Chem. Abstracts, volume 58 (February 1963), column 2409.

ALEX MAZEL, *Primary Examiner.*

RICHARD J. GALLAGHER, *Assistant Examiner.*